Sept. 20, 1971  S. O. I. JONSSON ET AL  3,605,964
AUTOMATICALLY REVERSING FREE-WHEEL CLUTCH
Filed Nov. 24, 1969

United States Patent Office 3,605,964
Patented Sept. 20, 1971

3,605,964
AUTOMATICALLY REVERSING FREE-WHEEL CLUTCH
Sven O. I. Jonsson, Storebro, and Bertil R. Jonsson, Vimmerby, Sweden, assignors to Vallakra Mekaniska Verkstad, Vimmerby, Sweden
Filed Nov. 24, 1969, Ser. No. 879,437
Claims priority, application Sweden, Nov. 26, 1968, 16,085/68
Int. Cl. F16d 25/063
U.S. Cl. 192—40                                 10 Claims

ABSTRACT OF THE DISCLOSURE

A normally disengaged fluid pressure engaged clutch is between a power take-off shaft connected to a tractor engine and a driven shaft connected to trailer wheels. When the tractor wheels slip, the speed of the power shaft becomes greater than the speed of the driven shaft, thus closing switch means on a lost motion coupling in the driven shaft. The switch means opens a solenoid valve to supply fluid pressure to the clutch for engaging it whereby the engine drives the trailer wheels for additional traction. A reversing switch senses the direction of rotation of the power shaft and automatically renders the device operative in either direction of rotation. A manual override switch permits the clutch to be selectively engaged at any time.

---

Figure 1:
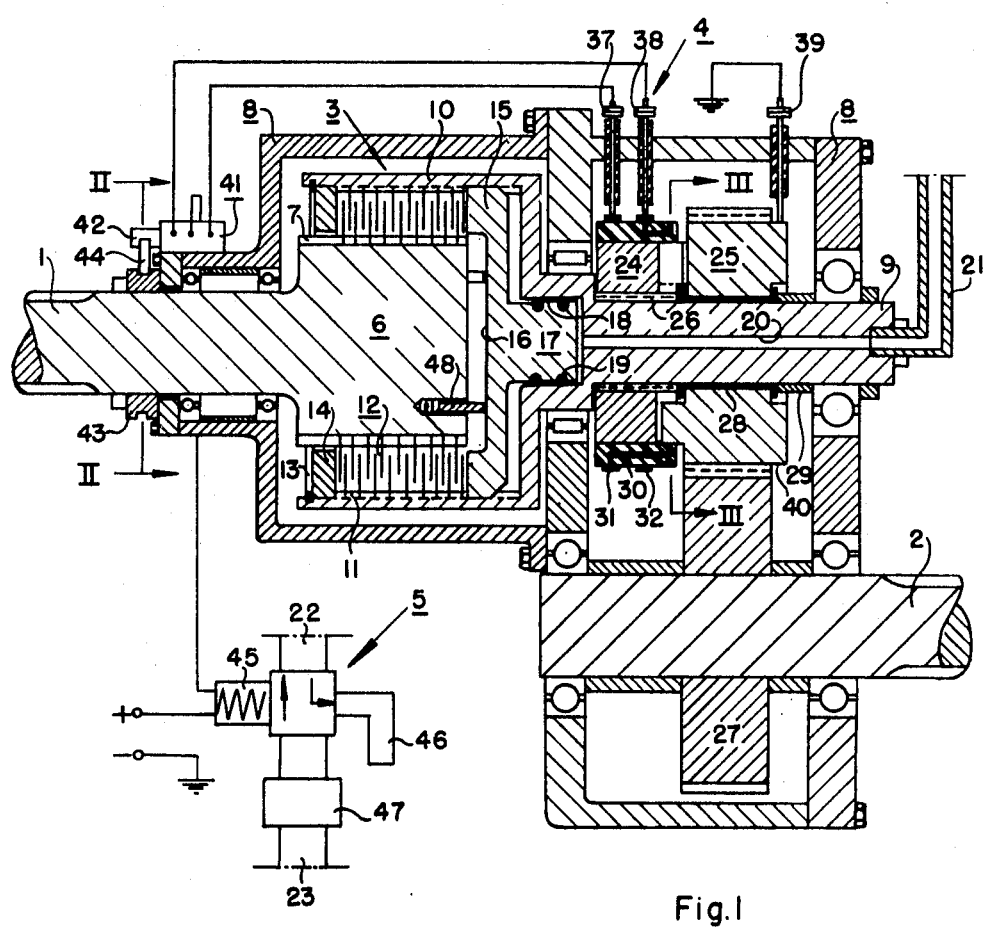

The present invention refers to an automatically, reversing, hydraulically actuatable free-wheel clutch of the kind preferably adapted to be mounted between a driving shaft and a free running shaft rotating at a higher speed than the driving shaft.

The clutch is basically of the kind, which during normal operation is disconnected but which is switched in so as to form a power shaft between the driving and the free running shafts if the rotational speed of the driving shaft is tending to exceed that of the free running shaft. A clutch of that kind may be used in many various technical fields and for several various purposes. It may for instance be used as a safety connector for preventing an overload of a driving motor, whereby an auxiliary motor driven by the clutch is automatically switched in if the driving shaft tends to be overloaded, or for preventing a racing of a machine by switching in a braking motor if the driving motor tends to race.

The main object of the clutch is however to serve as a free-wheel clutch whereby it is interconnected between the power takeoff of a driving vehicle and a corresponding power intake of a trailer provided with driving wheels. The driving wheels of said trailer thereby should be gear rated so as to rotate at somewhat higher speed than the power take off of the driving vehicle, and the purpose of the clutch is to automatically provide a driving of the trailer driving wheels at a skidding of the driving vehicle so as to obtain the increase of the driving power, which is necessary in order to abolish the skidding of the driving vehicle. When the carriage is then returning to its normal state and the wheels of the driving vehicle are no longer skidding the driving wheels of the trailer shall automatically be switched off by the clutch returning to its state of free-wheel clutch. The clutch is also of the kind, that the function mentioned above will automatically be brought about irrespective whether the carriage is being driven in a forward or a rearward direction. The clutch is in other words automatically reversing.

For the purpose of explanation the clutch will be described below only in connection to a tractor carriage comprising a pulling tractor and a pulled trailer however being provided with driving wheels, and in this connection the power connection shafts of the clutch will be called input and output shaft resp. It is however obvious to the man skilled in the art that the clutch may as well be inverted, so that the shaft below called the input shaft will be the output shaft and the output shaft will be the input one. There has previously been proposed clutches of the kind mentioned, and said clutches have practically without exceptions been formed with pawls which at normal operation without skidding of the driving wheels of the pulling vehicle will snap over a teethed wheel or ratchet wheel. At a skidding of the driving wheels of the pulling vehicle, whereby the rotating speed of the clutch input shaft is tending to exceed the rotating speed of the output shaft the pawls have immediately used to engage the ratchet wheel thereby providing an engagement of the free-wheel clutch with a subsequent driving of the trailer driving wheels.

Said previously proposed clutches however possess certain disadvantages. At very high rotating speeds or at transmission of very high torques the engagement of the pawls against the teeth of the ratchet wheel may occur with such a power that the pawls or the ratchet teeth will be damaged. Therefore it has been necessary to dimension said clutches for far greater loads than the usual load during normal operation, as a consequence of which the clutches have become unnecessarily large and expensive.

It has also proved that it might sometimes be advantageous if the clutch might be brought into engagement by manual actuation, so that a driving of the trailer driving wheels might be brought about even when there is no skidding of the driving wheels of the pulling vehicle, i.e. even if the output shaft is still rotating at higher speed than the input shaft. This is not possible with the previously proposed clutches without essential reconstructions and obvious difficulties.

There has also been raised wishes for a clutch, which might be adjusted for various needs of power, and which is consequently so technically flexible, that it may be used on such occasions, where the requested need of power is varying, or that it will at the same time act as an overload safeguard and as an actuation means for temporarily switching in an auxiliary motor at overload.

The present invention is intended to overcome the above mentioned disadvantages of previously known clutches and to provide a clutch which might be adapted to any possible need for power, which may manually easily be positively switched in upon need, and which will at the same time act as an overload clutch, a free-wheel clutch and an engagement clutch.

The invention will be described more in detail referring to the accompanying drawings, but it is to be noted, that the following detailed description only refers to explanatory examples and that it must not be considered limiting for the scope of protection of the invention.

Figure 2:
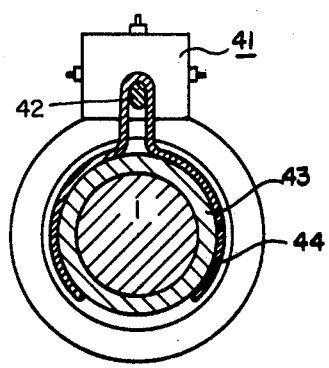
Figure 3:
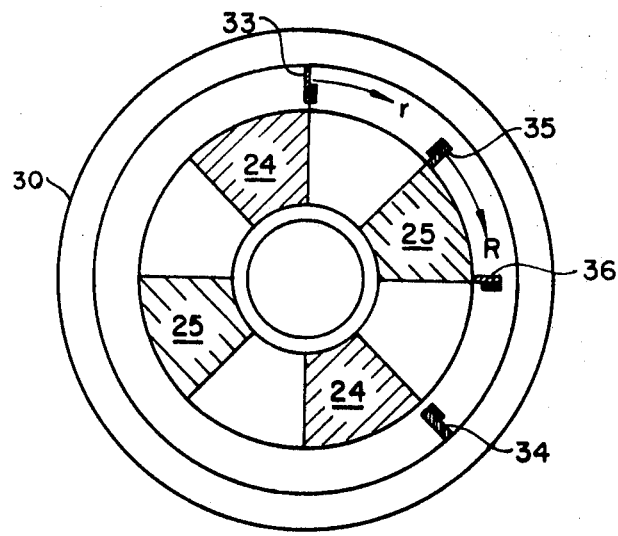
Figure 4:
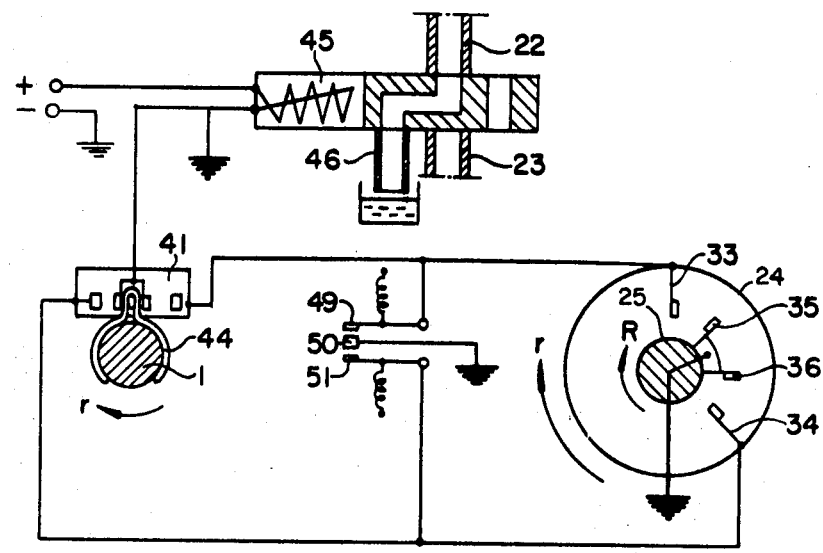

In the drawings FIG. 1 is illustrating a cross-section through a clutch according to the invention, where certain means necessary for the function have only been illustrated schematically. FIG. 2 is a fragmentary cross-section along the line II—II of FIG. 1, and FIG. 3 is somewhat schematically illustrating a cross-section along the line III—III of FIG. 1. FIG. 4 is schematic circuit diagram of the electro-hydraulic circuit for switching in the clutch according to the invention.

The clutch according to the invention is assembled to one single unit and includes a mechanical part for establishing a power transmission between an input shaft 1 and an output shaft 2, and electrical and hydraulic means for enabling an engagement and a disengagement resp. of the clutch. In FIG. 1 certain parts of the electro-hydraulic actuation unit have for the sake of simplicity been shown located outside the mechanical clutch unit.

The clutch is preferably intended to be interconnected between a power take off of a pulling vehicle as a tractor vehicle and a power intake of a trailer being provided with driving wheels. A pre-requisite for the function of the clutch in this connection is that the driving wheels of the trailer are so gear rated that the output shaft 2 of the clutch at straight line running of the vehicle upon plane ground is rotating at somewhat higher speed than its input shaft 1. The difference in numbers of revolutions between the output and the input shaft of the clutch may be calculated according to various needs, but it has proved suitable to give the output shaft a rotating speed being 2–8% higher than the rotating speed of the input shaft. The rotating speed of the output shaft should however under any circumstances be so much higher than the rotating speed of the input shaft that the driving wheels of the trailer at a turning of the tractor carriage will not be forced to drive except when the driving wheels of the tractor are skidding at the same time. At a turning of the tractor carriage of the actual kind the driving wheels of the trailer are moving along a path having a smaller radius of curvature than the driving wheels of the tractor, and therefore the periphery speed of the tractor wheels will normally be 2–8% higher than the periphery speed of the trailer wheels, and in order to avoid a switching in of the clutch at such a turning the output shaft 2 consequently must have a rotating speed at normal running which is correspondingly higher than the rotating speed of the input shaft.

Intermediate the input shaft 1 and the output shaft 2 the clutch includes a hydraulically actuatable friction clutch, generally indicated by the reference number 3 and an electrical actuation unit 4 for a three-way magnetic valve 5 the object of which is to establish or break a passage for pressurized hydraulic fluid for the actuation and switching in of the hydraulically actuated friction clutch 3.

The input shaft 1 is in its end turned against the inner part of the clutch formed with a cylindrical head 6 having axial splines 7 along its periphery. Between the input shaft 1 and the output shaft 2 is an intermediate means mounted in a clutch casing 8. Co-axially with the input shaft 1 a disc casing shaft 9 enters the clutch, said shaft 9 at its inner end being formed with a cylindrical hollow disc casing 10 concentrically within itself enclosing the head 6 of the input shaft 1. The disc casing 10 is along its inner envelope surface formed with axial splines 11 preferably being of the same form and size as the splines 7 of the shaft head 6. Intermediate the disc casing 10 and the head 6 of the input shaft an annular space is defined for receiving a number of friction discs 12 which in the conventional manner are interspersely arranged, i.e. every second disc is engaging the splines 7 of the input shaft and every other disc is engaging the splines 11 of the disc casing. Close to its outer end the disc casing 10 has a radial groove round its inner periphery in which a resilient locking ring 13 has been introduced, said ring 13 preventing a counter pressure disc 14 from being axially pushed out of the disc casing 10. In its inner end the disc casing 10 encloses a pressure disc 15 having axial splines corresponding to the splines 11 of the disc casing round its outer periphery and being formed with an axial cavity 16 of such a diameter and depth that the pressure disc 15 may be moved in the axial direction against the counter pressure disc 14 so as to force the friction discs 12 together. In its end turned outwards the pressure disc 15 is formed with a central cylindrical piston part 17 which is axially mounted in a hollow cylindrical part 18 of the disc casing shaft 9. In order to obtain a good sealing between the piston 17 and the cylinder 18 said piston is provided with two sealing rings 19 as for instance sealing O-rings. Concentrically through the disc casing shaft 9 a bore 20 extends into the cylinder 18, and the bore is in its outer end connected to a supply conduit 21 for hydraulic fluid. The connection between the supply conduit 21 and the disc casing shaft 9 is of the kind that the disc casing shaft 9 may rotate while on the contrary the conduit 21 is standing still. The conduit 21 is connected to the output 22 of the magnetic valve 5, the hydraulic input of which is connected to the hydraulic system existing at the pulling vehicle. Between the cylindrical part 18 of the disc casing shaft 9 and its connection to the supply conduit 21 a circular toothed coupling 24, 25 is mounted on said shaft 9, and the part 24 of the coupling is by splines 26 secured against rotation with respect to the disc casing shaft 9. The other part 25 of the toothed coupling is on the contrary freely rotatable with respect to the shaft 9, and the teeth of the toothed coupling parts 24 and 25, as evident from FIG. 3, are arranged with some clearance in relation to each other so as to enable a certain rotation of one part in relation to the other. The movable part 25 of the toothed coupling is formed as a cog wheel, which engages a cog wheel 27 mounted on the output shaft 2, and power from the output shaft 2 to the input shaft 1 or vice versa is transmitted over said second cog wheel 27.

The movable part of the toothed coupling or the cog wheel 25 is mounted electrically isolated upon the shaft 9 by means of a sleeve 28 of an insulating material, which sleeve with radially outwards directed flanges extends somewhat radially outwards at each end of the cog wheel 25. At one side of the cogwheel 25 said radial flanges prevent electrical contact between the cog wheel 25 and the fixed part 24 of the toothed coupling and at the other side between the cog wheel 25 and a distance sleeve 29, which will prevent any axial displacement of the cog wheel 25 and the isolating sleeve 28.

The fixed part 24 of the toothed coupling is round its periphery being provided with a ring 30 of an electrically insulating material, which is secured against rotation in relation to the r ing 24 of the toothed coupling. The teeth of the parts 24 and 25 are in conventional way formed as axially extending projections engaging the slot between two adjacent projections of the opposed part of the toothed coupling. As illustrated in FIG. 3 the toothed coupling in the illustrated embodiment includes two teeth on either of the parts 24 and 25 arranged diametrically against each other and in cross-section formed as segments of a circle with an angle of 45°. The two parts of the toothed coupling will thereby have a possibility of rotating 90° with respect to each other. If suitable the toothed coupling may be provided with several teeth, and the relative rotational angle between the two parts 24 and 25 may be varied after the actual circumstances.

The isolating ring 30 is of an axial length so as to extend at least some distance over the teeth of the fixed part 24 of the toothed coupling and it is round its periphery provided with two fixed mounted contact rings 31 and 32 of an electrically conducting material. Each contact ring is connected to each one contact pin 33 and 34 extending somewhat radially inwards from the outer periphery of the isolating ring 30, however not as far as to the outer periphery of the coupling teeth. The contact surfaces of the contact pins are directed peripherally and against each other, and the contact pins 33 and 34 are mounted closely adjacent the imaginary extension of two adjacent radial surfaces of the teeth of said fixed part of the toothed coupling. The movable part of the tooth coupling is likewise provided with contact pins 35 and 36 extending so far radially outwards from one and the same tooth of said movable part 25 of the toothed coupling, that the contact surfaces of the pins 35 and 36 with respect to their radial disposition correspond to the radial location of the contact surfaces of the pins 33 and 34. The contact pins 35 and 36 are located in the imaginary extension of each one of the radial surfaces of the tooth of the movable part 25 of the tooth coupling which is positioned intermediate the contact surfaces of the contact pins 33 and 34, and therefore the contact surfaces of the pins 35 and 36 are turned against the contact surfaces of the pins 33 and 34. The contact pins 35 and 36 of the movable coupling part 25 are mounted directly onto the movable coupling part 25, so that an electrical contact constantly exists between the pins 35 and 36 and the toothed coupling part 25. Three sliding contacts 37, 38 and 39 project radially inwards through the coupling casing and said contacts are mounted electrically insulated in the coupling casing and their contact surfaces contact the contact ring 31, the contact ring 32 and a circular contact surface 40 of the cog wheel 25 respectively. The sliding contacts 37 and 38 are electrically connected to a pole reverser 41 for automatically pre-regulating the electro-hydraulic function means for the carriage to be driven forwardly and rearwardly resp. The pole reverser 41 is mounted on the clutch casing 8 close to the input shaft 1 and in such a position, that an actuating arm 42 for bringing about the pole reversion projects axially above the input shaft 1. In order to bring about a switch-over of the pole reverser 41 for establishing the electro-hydraulic function at driving forwards and rearwards resp., a slotted ring 43 is fixedly mounted on the input shaft 1, and an open, loop-formed spring 44 having an upper U-formed part engaging the actuating arm 42 of the pole reverser is engaging the slot of the ring 43. The spring 44 is by spring action standing in friction engagement with the slotted ring 43 and rotation of the input shaft and consequently of the ring 43 will cause a twisting force to be transmitted to the spring 44, which will if possible automatically switch over the pole reverser 41 to the position corresponding to the rotating direction of the shaft 1, i.e. the driving direction of the carriage. The pole reverser 41 may preferably be a 3-pole toggle switch, of which the sliding contacts 37 and 38 are connected to each one contact of current and the intermediate zero-contact is connected to one-pole of the magnetic valve 5. The second contact of the magnetic valve is connected to one pole of a source of current, while the sliding contact 39 from the cog wheel 25 is connected to the electrical conducting material of the free-wheel clutch, to which the opposite pole of the source of current is also connected.

The magnetic valve 5 may be a conventional 3-way valve which is being actuated by means of solenoid 45, which solenoid will in a state without current take a position so as to enable the hydraulic fluid in the cylinder 18, the bore 20 and the conduit 21 to be evacuated through a return conduit 46. This position of the valve is illustrated in FIG. 4. When thereafter the current circuit of the solenoid 45 is closed the valve piston as shown in FIG. 4 moves in the left hand direction, whereby a connection is opened for pressurized hydraulic fluid from the source of pressure for said hydraulic fluid, through the inlet 23 and the outlet 22 of the valve 5 and further over the conduit 21 into the cylinder 18, whereby the piston 17 will clamp the friction discs and establish a power axle between the output and input shafts 2 and 1 of the clutch. In order to make it possible to vary the pressure with which the friction discs 12 are being clamped together an adjustable reduction valve 47 is interconnected in the hydraulic circuit in front of the valve 5, and by varying the pressure of the hydraulic fluid by means of said reduction valve the friction clutch may be brought to skid at a certain predetermined transmitted torque. This will prevent an overload of the clutch which might otherwise arise.

With particular reference to FIGS. 3 and 4 of the drawings the function of the clutch will now be explained more in detail. In the described embodiment the clutch is interconnected between the power take off of a tractor vehicle and the input shaft of a trailer having driving wheels and the function is starting as soon as the carriage begins to move. We may in the following presume that a running forward of the carriage will cause a clockwise rotation of the input and the output shaft, i.e. as shown by the arrows of FIG. 3, and that the input shaft will thereby begin to move with the rotating speed $r$. The head of the input shaft will thereby rotate the discs being mounted to said head, and this rotating movement will be transmitted to the disc casing 10 due to the weak but still existing friction between the friction discs, and this will bring the pressure disc 15 with the piston 17 and the fixed part 24 of the toothed coupling to rotate in a clockwise direction with the same rotating speed as the input shaft 1. At the same time as the tractor vehicle begins to move and the input shaft 1 due thereto begins to rotate the trailer will also begin to move and due thereto also the output shaft 2 begins to rotate. Part 25 is also rotating in a clockwise direction but with a rotating speed $R$, which is somewhat higher than the speed $r$ of the input shaft 1.

At the same time as the input shaft 1 begins to rotate the spring 44 actuating the pole reverser 41 will turn in the clockwise direction until the zero-contact of the pins 35 and 36 will rotate in a clockwise direction-pole reverser has come into contact with the right hand pole hand contact in FIG. 4. Electrical conduction is thereby present from the source of current to the contact pin 33 which is mounted on the fixed coupling part 24. This coupling part is rotating at the speed $r$, but since the movable toothed coupling part 25 is rotating with the speed $R$, which is higher than the speed $r$ the contact pins 35 and 36 will rotate in a clockwise direction in relation to the contact pins 33 and 34. This relative rotation will go on until the teeth 25 come into contact with the teeth 24, whereby the contacts 36 and 34 come into contact with each other. The contact 34 is however without current and no closed electric circuit will arise due to this action. A continued rotaton of the cog wheel 25 with the speed R will cause a rotation of the fixed toothed coupling part 24, the disc casing 10 and the pressure disc 15 with a rotational speed being $(R-r)$ higher than the rotational speed of the input shaft. This is possible due to the fact, that the discs are skidding. The skidding between the discs is however so small, that there will be no risk of overheating or any other damage. In running the carriage with a speed of for instance 30 km./h. the input shaft 1 is rotating at a speed of about 150 r./m. If we presume that the output shaft is rotating with 5% higher speed there will be a relative rotation between the output and the input shaft and consequently between the friction discs of 7.5 r./m., which rotation with respect to wear and heating is negligibly small. For eliminating any possibility of overheating of the discs the clutch is preferably arranged in an oil bath.

As stated the starting rotation in the clockwise direction of the disc casing 10 takes place due to the small friction between the friction discs, but in order to ascertain that no false-function will be able to arise the head 6 of the input shaft is preferably provided with two or more friction taps 48 directed radially in towards the pressure disc 15 and contacting said disc under spring pressure, and suitably the tops of said friction taps 48 may be provided with friction layers.

The position of the coupling thus described will be maintained until the driving wheels of the tractor vehicle begin to skid and the input shaft due to this skidding increases in rotational speed in relation to that of the output shaft, for when the input shaft has reached a rotational speed which is higher than the speed R of the part 25, and hence of the output shaft 2 the disc casing 10 will begin to rotate in a clockwise direction in relation to the movable toothed coupling part 25 forced by the friction discs and/or the friction taps 48, and when the toothed coupling part 24 has thus rotated 90° in relation to the movable coupling part 25 the contacts 33 and 35 will touch each other. Thereby the case occurs, that a current circuit will be closed from the source of current over the solenoid 45 of the valve 5, over the pole reverser 41, the contact 33, and the contact 35 to earth, and the valve will be moved to the left in FIG. 4, so that the pressure of the pressurized hydraulic fluid in the inlet 23 of the valve 5 will be transplanted through the valve, through its outlet 22, the conduit 21, the bore 20 and into the cylinder 18, whereby the piston 17 of the pressure disc 15 will be forced in the direction out of the cylinder 18, and the pressure disc 15 will force the friction discs 12 together. Thereby the coupling will form a unitary power axle and the output shaft together with the driving wheels of the trailer will be positively rotated by the power take-off of the tractor vehicle. The addition to the driving which is being obtained by the driving wheels of the trailer forcing the carriage forwards is presumed to be sufficient for the driving wheels of the tractor to stop skidding, and thereby the following will occur: The driving wheels of the tractor and the trailer begin to rotate with the same peripheral speed and the output shaft 2 of the clutch consequently begins to rotate at a speed R which is higher than the speed r of the input shaft. The movable coupling part 25 will thereby immediately begin to rotate in a clockwise direction in relation to the fixed coupling part 24 whereby the contact 33–35 will be broken, the teeth of the movable coupling part 25 will hit the teeth of the fixed coupling part 24. At the same time as the contact 33–35 is being broken the valve 5 regains its position shown in FIG. 4, whereby the hydraulic fluid existing in the cylinder 18, the bore 20 and the conduit 21 is evacuated through the return conduit 46, whereby the friction coupling will immediately be released. The output shaft 2 will thereby rotate the disc casing and the discs mounted therein in the above described manner with a rotational speed being somewhat higher than the speed of the input shaft 1.

In running rearwards with the carriage an automatic reversing of the function of the arrangement will be obtained by the spring 44 which in this case will switch in the opposite contact, whereby the contact pin 34 is being supplied with current so that a contact between the pins 34 and 36 will cause a switch in of the friction clutch as described above.

For enabling a switch in of the friction clutch upon demand without the driving wheels of the tractor vehicle skidding the arrangement has been provided with a manual actuation contact 49, 50, 51 by means of which the contacts 33–36 may be bridged. A pushing down of the contact 49 against the contact 50 will thus cause a switch in of the friction clutch in driving forwards, and a pushing down of the contact 51 against the contact 50 will cause a corresponding switch in of the friction clutch in driving rearwards.

What is claimed is:

1. An automatically reversing fluid actuated free-wheel clutch adapted to be operably interconnected between a driving shaft and a free running shaft which rotates at a speed higher than the driving shaft, said clutch being a fluid operated friction sliding clutch, wherein upon the application of sufficient fluid pressure the clutch parts engage and move as a unit, and wherein upon a reduction in said fluid pressure the clutch parts are capable of sliding relative to each other, a clutch actuation means for selectively introducing pressure fluid to engage the clutch, said clutch actuation means including an electrical circuit having first contacts mounted on the driving shaft, second contacts mounted for rotation with the free running shaft, and an electromagnetically operated valve which controls the flow of said pressure fluid to the clutch, the circuit being arranged such that it will be closed to operate the valve to cause pressure fluid to flow to the clutch to engage the same only when the rotational speed of the driving shaft exceeds the rotational speed of the free running shaft, wherein when the rotational speed of the driving shaft does not exceed the rotational speed of the free running shaft the valve prevents the pressure fluid from causing engagement of the clutch, said actuating means being operable to cause said engagement of the clutch for either direction of rotation of the driving shaft.

2. A clutch according to claim 1 wherein said clutch includes a first part fixed for rotation with the driving shaft and including first frictional surfaces, a head part having second frictional surfaces which engage the first frictional surfaces upon the introduction of said pressurized fluid to cause engagement of the clutch, said electrical circuit including third contacts mounted for rotation with the head part, the second and third contacts including one set of second and third contacts which are operable to close the valve when the speed of rotation of the driving shaft exceeds the speed of rotation of the free running shaft in one direction and a second set of second and third contacts which close to actuate the valve when the speed of rotation of the driving shaft exceeds the speed of rotation of the free running shaft in the other direction, the said first set of contacts being operable to actuate one or the other of said sets of second and third contacts depending on the direction of rotation of the driving shaft.

3. A clutch according to claim 2, wherein the second contacts are mounted on a first toothed part rotatable with the head part, and the third contacts are mounted on a second toothed part rotatable with the free running shaft, the teeth of the first and second toothed parts being rotatably drivingly engageable with each other to form a toothed coupling, but wherein circumferential clearance is provided between the teeth of the two toothed parts.

4. A clutch according to claim 3, wherein the second toothed part of the toothed coupling is freely rotatable in relation to the head part of said clutch.

5. A clutch according to claim 4, wherein the toothed coupling is formed with four teeth, two teeth on each part thereof, each tooth having a radial angle of 45° and wherein the teeth of each coupling part are mounted diametrically opposed to each other and between the teeth of the other toothed part, thus permitting a relative rotation between the two coupling parts of approximately 90°.

6. A clutch according to claim 5, wherein the teeth of the second toothed part of the toothed coupling are formed with the two said third electrical contacts mounted thereon in planes passing through two opposite radial sides of one tooth thereof, and wherein each tooth of the first toothed part has formed thereon one of said second electrical contacts mounted in a plane coincident with that radial side of the tooth facing the contacts of the first toothed coupling part.

7. A clutch according to claim 6, wherein the electrical contacts of the first toothed part of the toothed coupling are each connected to one pole terminal of a pole reverser which is supplied with current from a source of current which at the same time supplies current to the said electromagnetic valve, and wherein the electrical contacts of the second toothed part of the toothed coupling are connected to grounds, such that an actuation of the electromagnetic valve takes place when one of said sets of second and third contacts contact each other.

8. A clutch according to claim 7, wherein the second toothed part is electrically insulated from the other parts of the clutch, and the electrical contacts of the first toothed part are electrically insulated from the rest of the coupling, and the pole reverser is mounted to be engaged by said first set of contacts which are mounted on the driving shaft.

9. A clutch according to claim 8, wherein the pole reverser is mounted with a projecting actuation arm directed on a line with the driving shaft and said actuating arm is adapted to be actuated in either of two directions by a spring ring frictionally mounted around the driving shaft such that the actuation arm will automatically cause a switchover of the pole contact and a following reverse of the clutch operation in response to a reverse of the rotational direction of the driving shaft.

10. A clutch according to claim 9, wherein the electrical contacts of the first toothed part are connected each to one pole terminal of a three-pole toggle switch, in which the zero-contact is connected to the non-charged pole of the electromagnetic valve, thereby providing a manual switch to cause engagement of the frictional surfaces of the clutch even when the free running shaft of the clutch is rotating at a higher speed than the driving shaft.

References Cited

UNITED STATES PATENTS

| | | | |
|---|---|---|---|
| 3,251,439 | 5/1966 | Randol | 192—56FX |
| 3,351,167 | 11/1967 | Moss | 192—56F |
| 3,481,436 | 12/1969 | Wilkowski | 192—35 |
| 3,482,669 | 12/1969 | Foster-Pegg | 192—56FX |

BENJAMIN W. WYCHE, Primary Examiner

U.S. Cl. X.R.

192—43, 47, 56F; 180—14B, 44